United States Patent [19]
Rao

[11] Patent Number: 5,982,069
[45] Date of Patent: Nov. 9, 1999

[54] AXIAL GAP MACHINE PHASE COIL HAVING TAPERED CONDUCTORS WITH INCREASING WIDTH IN RADIAL DIRECTION

[76] Inventor: Dantam K. Rao, 2212 Lynnwood Dr., Schenectady, N.Y. 12309

[21] Appl. No.: 09/106,773

[22] Filed: Jun. 30, 1998

[51] Int. Cl.[6] .................................................. H02K 1/22
[52] U.S. Cl. ........................... 310/208; 310/201; 310/268
[58] Field of Search ..................................... 310/179, 180, 310/193, 198, 200, 201, 203, 206, 208, 268, DIG. 6, DIG. 3; 174/115; 29/596, 598

[56] References Cited

U.S. PATENT DOCUMENTS

| | | | |
|---|---|---|---|
| 242,898 | 6/1881 | Edison | 310/268 |
| 1,631,186 | 6/1927 | Apple | 310/179 |
| 2,504,825 | 4/1950 | Meyer et al. | 310/268 |
| 3,014,139 | 12/1961 | Shildneck | 310/179 |
| 3,165,657 | 1/1965 | Henry-Baudot | 310/268 |
| 3,223,870 | 12/1965 | Henry-Baudot | 310/268 |
| 3,790,835 | 2/1974 | Takeda | 310/268 |
| 4,204,129 | 5/1980 | Hutchins, Jr. | 307/147 |
| 4,340,833 | 7/1982 | Sudo et al. | 310/268 |
| 4,400,226 | 8/1983 | Horrigan | 156/56 |
| 4,484,097 | 11/1984 | Kamayama et al. | 310/268 |
| 4,677,332 | 6/1987 | Heyraud | 310/184 |
| 5,099,162 | 3/1992 | Sawada | 310/198 |
| 5,124,604 | 6/1992 | Swartz | 310/68 B |
| 5,519,226 | 5/1996 | Chitayat | 310/12 |
| 5,563,376 | 10/1996 | Hansell, III et al. | 174/102 R |
| 5,710,476 | 1/1998 | Ampela | 310/268 |
| 5,744,896 | 4/1998 | Kessinger, Jr. et al. | 310/268 |

OTHER PUBLICATIONS

P. Campbell, "Principles of a Permanent–Magnet Axial–field d.c. Machine", vol. 121, No. 12, Dec. 1974, pp. 1489–1494, *Proceedings of the Institute of Electrical Engineers*.

F. Profumo, Z. Zhang and A. Tenconi, "Axial Flux Machines Drives: A New Viable Solution for Electric Cars", vol. 44, No. 1, Feb. 1997, pp. 29–45, *IEEE Transactions on Industrial Electronics*.

*Primary Examiner*—Nestor Ramirez
*Assistant Examiner*—Tran N Nguyen
*Attorney, Agent, or Firm*—Clyde I. Coughenour

[57] ABSTRACT

The torque produced by an electric machine of the type generally known as an axial air gap motor or generator is increased by using nonuniform conductor wires in the stator phase coils in the areas of the coil where the conductor wires extend radially outwardly from and where they extend radially inwardly toward the center of rotation, i.e. that portion of the coil regarded as the active sectors of the coil. The tapered conductor wires enable the total number of wires employed in a phase coil to be doubled by determining the number of wires that can be used at the median radius of the coil rather than at the inner radius. The tapered conductor extends to cover a greater area within the bounds of the coil. With the tapered width designed to extend and increase radially outwardly from the center of rotation, essentially all the surface area within the windings of the coil can be covered by the conductor wires. Only the insulation areas between the wires is not covered by the conductor wires. Tapered conductor wires increase the "fill factor" and reduce degradation in the torque due to the magnetic field not being crossed by conductors carrying current. By overlapping and splitting the coils into sections and securing the facing coil sections with impervious rings and baffles, a cooling fluid passage is formed between the stator coil sections.

20 Claims, 4 Drawing Sheets

AXIAL GAP MACHINE PHASE COIL HAVING TAPERED CONDUCTORS WITH INCREASING WIDTH IN RADIAL DIRECTION

BACKGROUND OF THE INVENTION

1. Field of the Invention

The invention relates to an improvement in the design of axial gap slotless electric motors and generators by increasing the torque that can be obtained for a given radial size rotor, and to reducing the size and weight of such a machine by using tapered coil conductors; and to improving the cooling capacity of the machine.

2. Description of Related Art

Electric motors and generators of the axial gap type are well known. They employ motors that deliver axially directed magnetic fields to stationary radially directed electrically conductive coils of wire. It is common to have rotors with permanent magnets of alternate polarity with the magnets of opposite rotors attracting each other, concentrating the magnetic field across a stator sandwiched in between the permanent magnet rotors. In the motor mode, electric current is passed through the stator windings. Currents flowing through the radially positioned conductors intersect the axial field created by the magnets to produce a torque that rotates the motor rotor. In the generator mode the magnets are rotated by an external prime mover. When this happens, the rotating magnet's axial field interacts with the radial conductor coils to induce a current flow in and voltage across the conductor coils. FIG. 1 illustrates a prior art configuration showing the direction of current, magnetic field and resulting forces. FIG. 2 illustrates the prior art phase coil arrangement. The phase coil is a continuous conductor wound flat in a closed loop form. It generally consists of "active sectors" or areas (i.e., those portions of the coil that extend radially out from and perpendicular to the axis of rotation of the rotor and that cross the magnetic field created by the magnets and "inactive sectors" or areas (i.e. those portions of the coil that are outside the magnetic field which connect the active sectors). The current in the active portion of the coils flows radially outwardly on one side and radially inwardly on the other or opposite side of the coil.

FIG. 1 illustrates the interaction of the magnetic fields and currents under consideration and in the prior art axial gap motor 10. Two rotating permanent magnet disks 1, 2 sandwich a stator ring 3 separated by two air gaps 4, 5 as they rotate about an axis 7. The rotating magnet rings 1, 2 have alternately poled flat permanent magnets, typically of sector shape, which produce an axially directed magnetic field 6 across the air gaps. The stator ring 3 contains sets of phase coils. Radially directed current 8 in the active part of the coil conductors interacts with the axially directed magnetic field 6 to produce a tangentially directed force 9 which creates the torque that drives the motor.

FIG. 2 illustrates a typical arrangement of phase coils 23 on a stator ring 21 of a stator 20 having an opening 25 that accommodates a rotor that rotates about an axis of rotation 7. In the coils the conductor wires form loops with the wires formed into an essentially inner radius or sector 27 and outer radius or sector 26 with radial conductor wires 22 extending between the inner and outer radii of the coil. The standard uniform conductor wires used leave vacant areas 24 within and between the coils that are often overlapped. These empty areas are not utilized for generating torque. When using uniform cross-section conductors these "empty areas" equal $1_r/(2r_i)$ fraction of the conductor area where $1_r$=active length of conductor 22 under the rotating magnets and $r_i$=inner radius 27 of the coil. For a typical design with $1_r=r_i$, this implies that 50% of the space available for conductors in the stator is not used to produce torque. This ratio of "empty area" to "conductor area" is called the "spoke fill factor." This loss of useful area is unique to axial motors. It results in a loss in torque that is in addition to the conventional "shape fill factor", that defines the loss of area due to the shape of the wire, and the "insulation fill factor", that defines the loss of area due to the insulation coating on the bare copper wire. The combination of "shape fill factor" and "insulation fill factor" is called the "copper fill factor." As an example, round wires have a "copper fill factor" of 0.7. This loss coupled with a "spoke fill factor" of 50% yields a total fill factor of (0.7)(0.5)=0.35 or 35% for round wires. The situation is worse if Litz wires are used. Litz wires have typical "copper fill factors" of 0.4 to 0.55. This coupled with the "spoke fill factor" of 50% can yield a still lower total fill factor of (0.4)(0.5)=0.20 or 20%. This implies that only 20% of the available area is used to produce torque. As a result, the torque produced is significantly lower than what is possible when the entire available geometric area is used to produce torque.

As to specific details, the use of tapered conductors for armatures is old with Edison, U.S. Pat. No. 242,898, issued Jun. 14, 1881, and Apple, U.S. Pat. No. 1,631,186, issued Jun. 7, 1927, examples, as is tapered conductors for general electrical conduction in rotary electric machines with Henry-Baudot, U.S. Pat. No. 3,223,870, issued Dec. 14, 1965, and Kanayama et al, U.S. Pat. No. 4,484,097, issued Nov. 20, 1984, examples. Shildneck, U.S. Pat. No. 3,014,139, issued Dec. 19, 1961 is an example of tapered conductors combined and used to conduct coolant through electrical machinery. The patents by Edison. Henry-Baudet, and Kanayama, use individual radiating plates; these individual plates are joined electrically at their ends for electrical transfer only.

The basic theories pertaining to, and several illustrations and versions of, axial gap machines are set forth in an article by P. Campbell in *Proceedings of the Institute of Electrical Engineers*, Vol. 121, No. 12. December 1974, pages 1489–1494, and an article titled "Principles of a Permanent-Magnet Axial-field d.c. Machine," by P. Profumo, Z. Zhang and A. Tencolni in *IEEE Transactions on Industrial Electronics*, Vol. 44, No. 1, February 1997, pages 29–45, which are incorporated herewith by reference.

SUMMARY OF THE INVENTION

The present invention increases the torque capacity of an electric axial (gap machine and/or reduces its weight and/or size by replacing the uniform cross-section phase coil conductors with tapered conductors that expand laterally in width in the radial direction. The tapered conductor wires of the coils eliminate voids between wires, so that during rotation, conductor wires are continuously crossing all or almost all of the magnetic lines of force extending between the permanent magnets across the coil wires during relative movement between the rotor and stator, and also increase the number of wires that can be used in a coil. By overlapping coils, the tapered wires will also fill in the void created by the central area left open when a coil is formed as well as the voids that inherently exist between uniform cross-section conductor wires when they are fitted like radial spokes around an armature periphery. By bonding the adjacent tapered conductors together with a material that seals as well as insulates the adjacent conductors, they form a fluid impermeable section. By overlapping these sections and forming a seal between the adjacent and overlapping sections, they form a fluid-impermeable plate. By using two such fluid-impermeable plates back to back, a cooling fluid passage can be provided. Motors using the structure of the invention can be used in many applications such as locomotive traction motors, hybrid electric drives, underwater vehicles, tanks, ships, aircraft generators, stationary power sources, disc drives. etc.

DESCRIPTION OF THE PREFERRED EMBODIMENTS

The motor or generator under consideration can be considered to be of the Axial Gap, Permanent Magnet Brushless DC type. The conductors are arranged on the stator without slots, so the machine can also be categorized as being slotless. The phase coils are provided with tapered conductors to increase the torque capacity of the electric machine and/or to reduce the size and weight of the machine.

Figure 1:
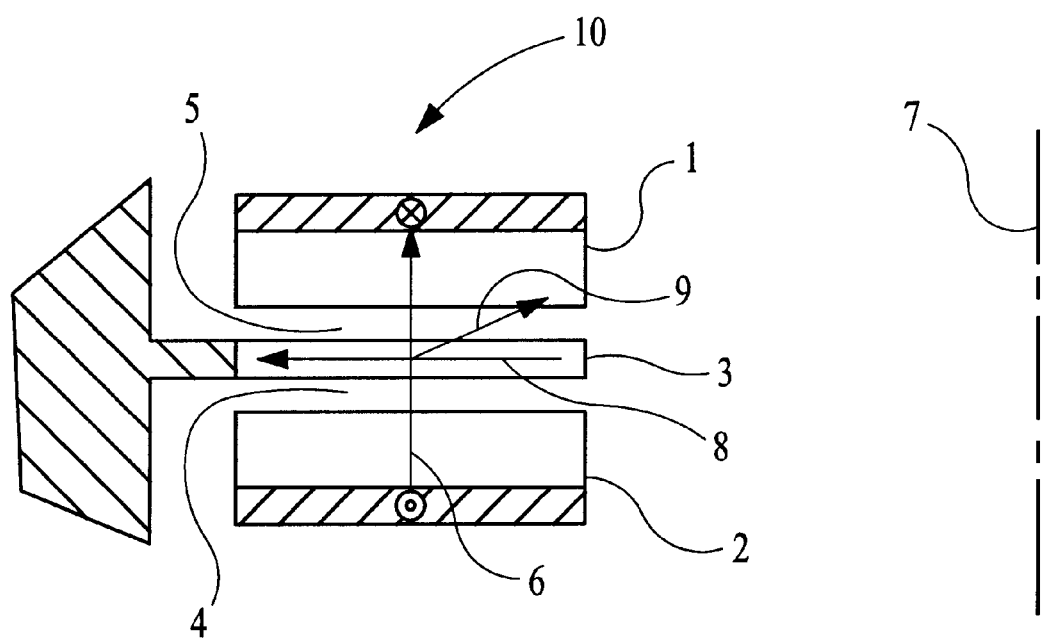
FIG. 1 is a sectional side view illustrating typical prior art flux and force lines.
Figure 2:
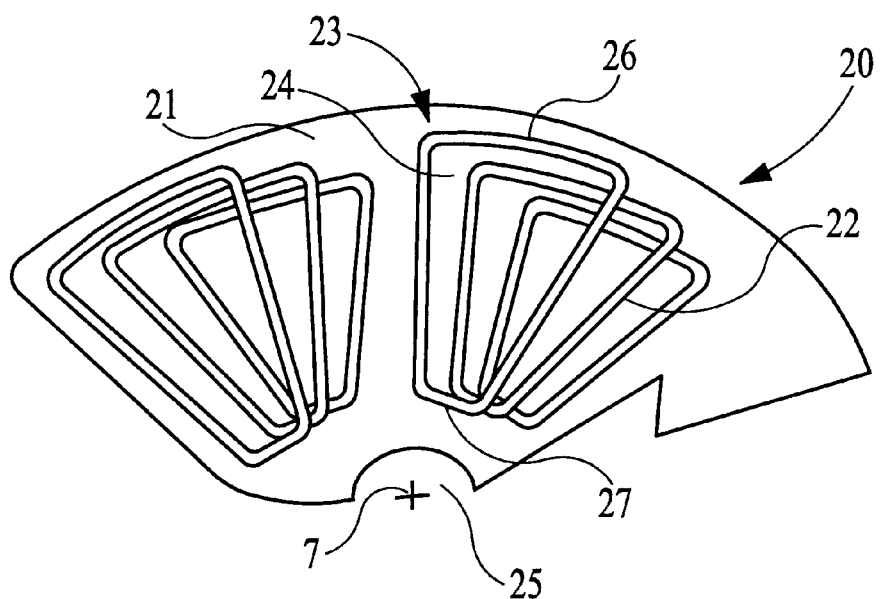
FIG. 2 is an end view of a typical prior art stator configuration.
Figure 3:
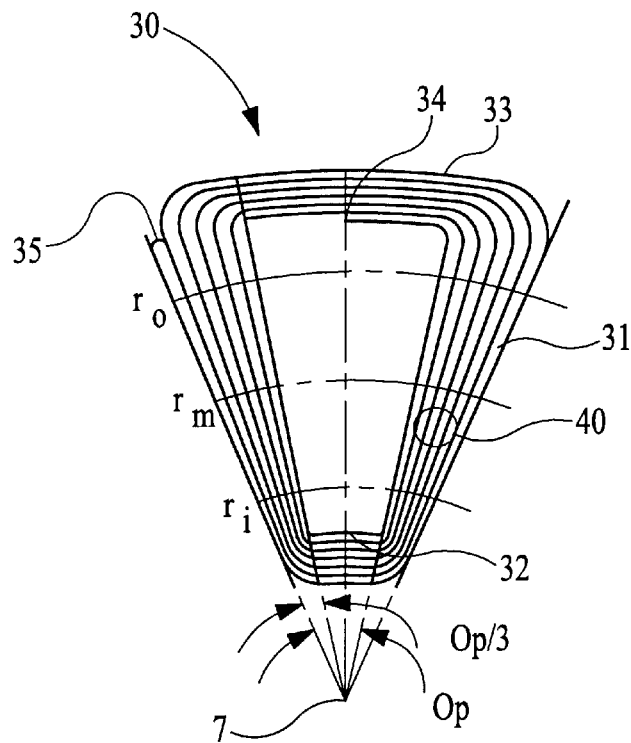
FIG. 3 is an end view of a phase coil of the invention.
Figure 4:
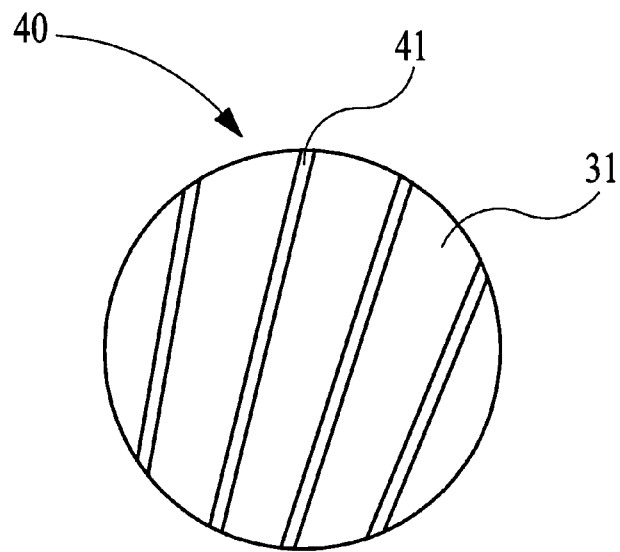
FIG. 4 is an enlarged view of a portion of the tapered conductors of FIG. 3.

FIG. 3 shows a coil 30 with electrical inlet and outlet points 34, 35. As can be seen in FIGS. 3 and 4, the tapered electrical conductors or wires 31 used to form the phase coils 30 have an increasing width as they progress or extend from the inner radius $r_i$ of the stator ring to the outer radius $r_o$ of the stator rind and perpendicular to the axis of rotation 7 of a rotor. The ratio of increase is preferably such that lines extended from both sides of a conductor will intersect at the center of rotation 7 of a rotor and/or the center of the stator ring, i.e. the conductors would come to a point if their sides were extended to the axis of rotation. The end windings 32, 33 are of uniform width as they extend along the inner radius $r_i$ and outer radius $r_o$ and run essentially in lines around the axis of rotation of the rotor. The width of a conductor is the distance between the sides of the conductor at any point along its length, as seen for example in FIGS. 3 and 4. In FIG. 4 the width of the conductor 31 is the shortest distance between one point on insulation seam 41 and an adjacent insulation seam 41 on the opposite side of the conductor. If desired, the cross-sectional area of the conductors can be maintained constant to give a uniform resistance to the flow of current. This can be done by increasing and decreasing the thickness of the conductor as the width is decreased and increased respectively. The thickness of a conductor is the distance between the top, seen in FIGS. 3 and 4, and bottom, hidden below the top as seen in FIGS. 3 and 4, of the conductor at any point along its length. Alternatively, the thickness of the conductor can remain constant as the width expands as the increasing cross-sectional area will not interfere with the operation of the coil so long as the cross-sectional area is sufficient to carry the current load.

For purposes of illustration, a somewhat arbitrary inner radius $r_i$, median radius $r_m$, and outer radius $r_o$ of the permanent magnet ring are shown on the coil of FIG. 3. The inner radius essentially represents the innermost extent of the permanent magnets of the rotor as the rotor passes by the stator coils. The outer radius essentially represents the outermost extent of the permanent magnets of the rotor. The portion of the coil beyond and inside radius $r_i$ and the portion of the coil beyond and outside the outer radius $r_o$ are the essentially inactive portions of the coil 30 that do not produce torque. These sectors of the coil are often referred to as end windings. The portions or sectors of the coils between the inner and outer radii $r_i$ and $r_o$ are the active portions of the coil. With a constant diameter or uniform cross-section conductor, the number of wires that can be placed side by side around the periphery formed by the inner radius and extend radially outward from the inner radius is limited by the peripheral width of the conductor. Prior art axial gap motor designs are limited by the finite number of uniform conductors that can be placed around the periphery formed by the inner radius due to this space limitation. Consider, as an example, an axial gap motor with a 4.6 in. outer radius and 1.53 in. inner radius. It has a total inner perimeter of 9.6 in. Considering a conductor with a uniform peripheral width 0.1 in, only a maximum total of 96 of these uniform conductors can be fitted around this inner radius peripheral. This small number of uniform conductors forms one of the limitations on the torque that can be produced in prior art motors.

By using a tapered conductor, the number of wires that can be placed side by side is essentially limited only to the width of the wire chosen by the mechanic taking into consideration the current that the conductor must carry and the acceptable thickness of wire protrusion in the axial direction. The active part of the conductor 31 is the portion of the coil that cuts across the path of magnetic fields and is the portion of the conductor that has a nonuniform cross-section. While it is not necessary that the conductor be rectangular, it is preferred that it be so in this area. This use of non-uniform electrical conductors can improve the torque capacity by up to 100% compared to a conductor with a uniform cross-sectional area. Consider the same motor as in the example above, with 4.6 in outer and 1.53 in. inner radii. The coil has a mean radius $r_m$ of (4.6+1.53)/2=3.06 in. or total mean perimeter at the mean radius of 19.2 in. This 19.2 in. mean periphery allows 192 tapered conductors of 0.1 in. mean width (at the mean radius) to be fitted around the stator ring mean perimeter. This is double the 96 uniform cross-section conductors that can be theoretically fitted around the prior art stator coil inner radius. Thus, for this particular example, using tapered phase coil conductors could increase the torque capacity by 100%.

Figure 7:
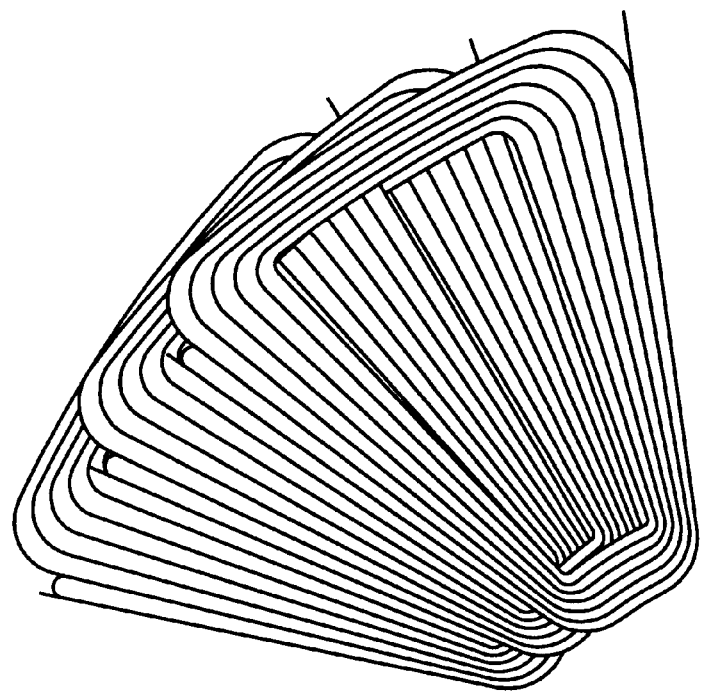
FIG. 7 is an illustration of three overlapping phase coils.

In a typical 3-phase motor, the stator contains three phase coils, usually labeled phase A, phase B, and phase C. As shown in FIG. 3, the phase coil has a winding 30 with an angle θp and an angle θp/3 set forth. The angle θp extends from the left-most radial conductor wire on the left sector of the coil to the left side of the right sector of the radial conductor wire of the coil. The angle θp/3 extends from the left-most radial conductor wire on the left sector of the coil to the right-most radial conductor wire on the left sector of the coil. This area corresponds to the typical phase A. The remaining portion of the coil ankle θp, or ⅔ θp, is the central portion of the coil. This portion of the coil, the void central area of the coil, contains the remaining typical phase coil areas B and C. By overlapping three phase coils, as depicted or illustrated in FIG. 7, the entire area can almost be completely covered with active conductor wires. The only area not covered by the conductor wires is the very small area between the wires that is filled with insulation.

In addition to showing the taper of the conductor 31, the enlarged area 40 of FIG. 4 also shows the insulation 41 that separates the conductor wires. The insulating slot is of uniform width. Its width may range from 1 to 10 mil depending on the application. In essence, the stator is covered with coils 30 having tapered radial conductor width 31 separated by uniform width insulation seams 41. As a result, almost all of the empty spaces 24 present in prior stator coil windings is absent. This increases the fill factor significantly. Typical fill factors of up to 93% can be achieved by this approach as compared to about 35% achieved in conventional designs. This increase in fill factor inherently increases the torque capability and adds to the improved torque obtained by providing more turns of conductor using the tapered conductor design.

Figure 5:
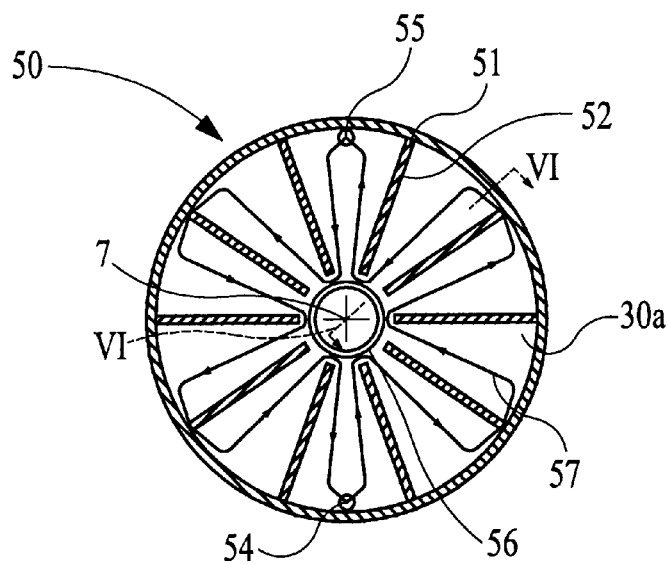
FIG. 5 is an end sectional view of the stator cooling fluid flow.
Figure 6:
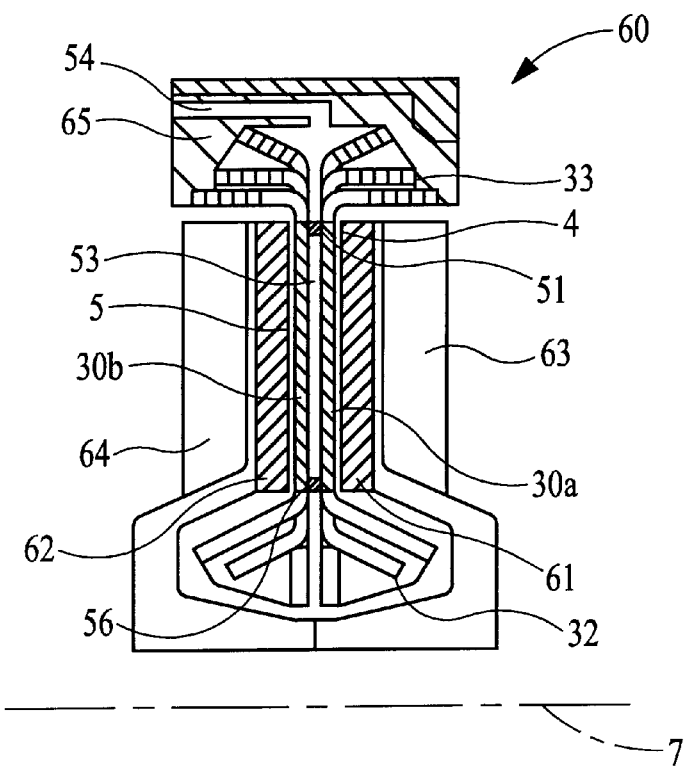
FIG. 6 is a sectional side view along line VI—VI of FIG. 5 showing a rotor and stator as assembled.

The insulated tapered conductors also enable an efficient heat evacuation mechanism. A cooling configuration that uses the tapered conductors to improve cooling is shown in FIGS. 5 and 6. With the tapered coil conductor design, overlapping coils, and using an insulation that also seals between the coil wires, and using a sealing means between coils, a fluid tight configuration can be obtained. The stator can be split into two layers or sections 30a, 30b separated by thin annular rings 51, 56 that form a passage 53 through which cooling fluid can be passed. By selective positioning of sealing guide strips or baffles 52, the path of cooling fluid 53 between the stator sections can be controlled. Several methods of positioning the baffles exist, and FIG. 5 shows only a representative version. It is understood that any method of directing cooling fluid through the two layers and baffles is acceptable.

FIG. 5 shows a cooling arrangement 50 with flow path 57 between stator sections having an inner 56 and outer 51 sealing ring and radial baffles 52 conducting cooling fluid between an inlet 54 and outlet 55 in a serpentine fashion.

FIG. 6 shows a cross-sectional side view of rotors 63,64 and stator 65 with a coolant inlet 54 in combination 60 essentially along the section line VI—VI of FIG. 5. Several outer coil sectors 33 and several inner coil sectors 32 extend from intermediate tapered radial coil sections 30a, 30b that are split apart to form a coolant passage 53 between them. The stator sections 30a, 30b are sandwiched between permanent magnets 61,62 with air gaps 4, 5 between the permanent magnets of the rotor and tapered conductor radial coil sectors of the stator. The coil thickness shown is the distance between the passage 53 and the air gaps 4,5. The ends of the coolant passage 53 are sealed by inner 56 and outer 51 sealing rings.

The cooling passage 53 with its inlet 54 and outlet 55 allow coolant to flow in a serpentine fashion between the split stator sections. The two thin gasket-shaped rings 51,56 positioned at the outer and inner periphery between the coil sections can be welded into position to space and secure the stator coil sections together. The layers of the split coil sections are also rigidly attached to each other by the securement of the radially extending baffles 52. These baffles prevent the layers from bulging under coolant pressure and direct coolant flow around the stator in a serpentine fashion forcing the coolant to contact or wet all surface areas and to remove heat created by current flowing through the coils. The coolant flows from one side of the stator to the other, contacting or wetting the surfaces of the stator to extract or remove heat.

The torque developed by an axial gap motor is proportional to the product of axial gap flux density $B_{ZO}$, a constant K for permanent magnets, the total number of turns $N_T$, the radial length of the conductor 1, the mean radius of the conductor $r_m$, and the peak current $i_o$ flowing through the conductor, i.e. $T=KN_T l_r r_m i_o$. As previously explained, in a tapered conductor design, $N_T$ the number of conductors that can be fit at the mean radius $r_m$ is significantly more than the number of uniform cross-section conductors that can be fit over the inner radius (i.e. over the inner radius using a conductor with a width that remains constant for the coil). The use of a greater number of conductors means that more torque can be generated using the tapered conductor design. If, for example, the inner radius is $\sqrt{3}$ times smaller than the outer radius, the mean radius will be $(1+\sqrt{3})/2=1.37$ times greater than the inner radius. In this case, using this tapered conductor designs 37% more loops of conductor can be fit into the coil. Since torque is proportional to the number of conductor loops, 37% more torque can be generated.

In the prior art axial (gap motors, $N_T$ conductors of uniform cross-section fit over the inner radius $r_i$, hence $T=K'r_i l_r r_m i_o$. The active length of the conductors $1_r$ is equal to the difference between the outer and inner radii ($1_r=r_o-r_i$). The mean radius $r_m$ is the average between the inner and outer radii $[r_m=(r_o+r_i)/2]$. As a result the torque produced by the prior art uniform conductor designs is proportional to $r_o^2 r_i - r_i^3$, i.e. $T=K'(r_o^2 r_i - r_i^3)$. In a typical design only the inner radius $r_i$ is varied ($r_o$ is kept constant). Differentiation of torque T with respect to inner radius $r_i$ and equating it to zero (dT/d $r_i$=0) indicates that the maximum torque is achieved when the inner radius is 57.7 % of the outer radius ($r_i=r_o/\sqrt{3}=0.577r_o$).

With the present design the number of tapered conductors employed is determined at the mean radius $r_m$ rather than at the inner radius, so $T=K'r_m l_r r_m r_o$. The active length of the conductor $1_r$ equals two times the difference between the mean radius and inner radius $[1_r=2(r_m-r_i)]$. As a result, the torque produced by the tapered conductor design is proportional to $r_m^3-r_i r_m^2$, i.e. $T=K'(r_m^3-r_i r_m^2)$. The torque is again maximized when dT/d $r_i$=0. Noting that if d $r_m$/d $r_i$=½, it can be shown that the maximum torque is achieved in the tapered conductor design when $r_i=r_o/3$.

Figure 8:
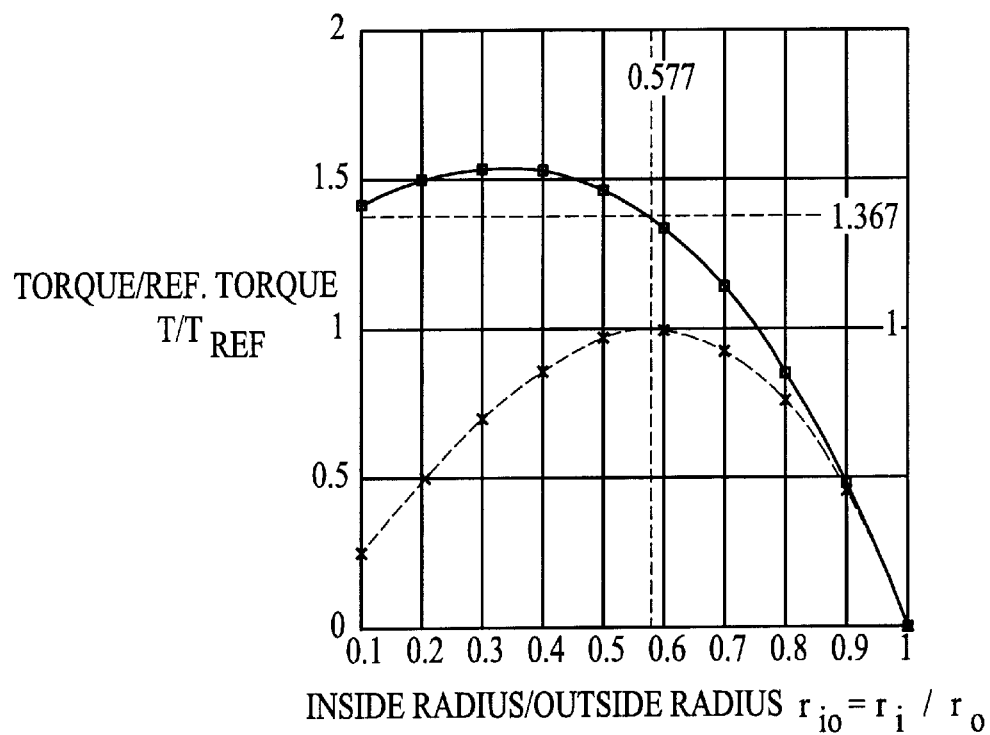
FIG. 8 is a graph illustrating improved torque using tapered conductors.

FIG. 8 compares graphically how the torque produced by the prior art uniform width or cross-sectioned conductor and the tapered conductor designs varies with $r_{io}=r_i/r_o$. This is a plot of torque produced, normalized with respect to maximum torque that can be produced by a uniform conductor design, vs. ratio $r_{io}=r_i/r_o$ of the inner and outer radius for a tapered conductor. In this, the dashed curve (with "x" markers) shows how the motor torque varies with $r_i/r_o$ in a uniform conductor design. The solid curve (with 'o' markers) shows the torque generated by a motor with non-uniform conductor design.

This plot shows that as the inner radius increases from a small fraction (0.2) to a large fraction (0.7), the motor torque increases with increasing inner radius. It reaches a maximum and then falls as it is increased further. It shows that tapered conductor design produces more torque than a uniform cross-sectioned conductor. The torque improvement produced by the tapered conductor design is examined for three particular cases:

(a) When $r_i=0.577r_o$, i.e. $r_i=r_o/\sqrt{3}$, the uniform conductor design reaches a maximum value $T_{ref}$. At this point, the tapered conductor design produces 1.367 times this maximum value. For this particular inner radius, tapered conductor design produces 36.7% more torque than the uniform conductor design;

(b) When $r_i=0.5r_o$, the uniform conductor design produces 0.97 times the maximum torque $T_{ref}$. At this point, the tapered conductor design produces 1.45 times more torque than the uniform conductor design maximum value. This tapered conductor design produces 49% more torque than the uniform conductor design when $r_i=0.5r_o$.

(c) If the inner radius is reduced to $r_o/3$, a uniform section conductor design yields $0.75T_{ref}$. The same size motor employing tapered conductors produces 1.54 $T_{ref}$. This means that tapered conductor motor can increase torque by 1.54/0.75 or 200%. In other words the tapered conductor design doubles the torque capacity of a uniform cross-section wire.

The decree of torque enhancement obtained by the tapered conductor thus depends on the inner radius/outer radius ratio and can vary from 37% to 100% for practical cases. These torque-improvement principles outlined above can also be applied to other motor configurations than the one that employs a single stator interacting with two rotor disks, such as multiple rotor disks interacting with multiple stator disks.

It is believed that the construction, operation and advantages of this invention will be apparent to those skilled in the art. It is to be understood that the present disclosure is illustrative only and that chances, variations, substitutions, modifications and equivalents will be readily apparent to one skilled in the art and that such may be made without departing from the spirit of the invention as defined by the following claims.

I claim:

1. A coil for use in a rotary electric machine comprising:
    said coil having plural turns of an electrical conductor formed from an electrically conducting material;
    said coil having an inner coil loop sector and an outer coil loop sector and radial coil sectors extending between said inner coil loop sector and said outer coil loop sector;
    said electrically conducting material having a top, bottom, and sides, defining a thickness and a width;
    said electrically conducting material of said radial coil sectors having an increasing width in a radial direction going from said inner coil loop sector to said outer coil loop sector.

2. A coil for use in a rotary electric machine as in claim 1 wherein:
    said coil is a sector-shaped coil with said inner coil loop sector being shorter than said outer coil loop sector and said electrically conducting material of said radially extending coil sectors radiating outwardly such that lines drawn from either side of said electrically conducting material of said radially extending coil sectors will meet at a point.

3. A coil for use in a rotary electric machine as in claim 2 wherein:
    said turns of electrically conducting material are separated from and spaced from each other by a material that is both an insulator, to the flow of electricity, and impermeable, to the flow of a cooling fluid.

4. A coil for use in a rotary electric machine as in claim 3 wherein:
    said insulation material is an epoxy.

5. A coil for use in a rotary electric machine as in claim 1 wherein:
    said electrical conducting material has a uniform cross-sectional area throughout its length.

6. A coil for use in a rotary electric machine as in claim 5 wherein:
    said uniform cross-sectional area is maintained uniform in said radical direction where said electrical conducting material has an increasing width, by decreasing said thickness of said electrical conductor material.

7. A coil for use in a rotary electric machine as in claim 1 wherein:
    said electrically conducting material in both said inner coil loop sector and said outer coil loop sector have a uniform width.

8. A coil for use in a rotary electric machine as in claim 1 wherein:
    said electrically conducting material forming said coil is wound flat so that said coil is essentially coplanar.

9. A coil for use in a rotary electric machine as in claim 8 wherein:
    a plurality of said coils are used together;
    said coils are overlapped to form an essentially continuous area covered by said electrically conducting material.

10. A coil for use in a rotary electric machine as in claim 9 wherein:
    said coils are each split into two sections;
    said coil sections are separated by baffles and sealing rings;
    said baffles and sealing rings both space said phase coil sections from one another and secure a phase coil sections to one another in said spaced configuration.

11. A coil for use in a rotary electric machine as in claim 10 wherein:
    said baffles and said sealing rings are positioned so as to be able to conduct cooling fluid through said coil sections in a serpentine fashion.

12. A coil for use in a rotary electric machine as in claim 1 wherein:
    said phase coil is split into two sections;
    said coil sections are spaced apart from one another to form a cooling fluid passage for removing heat from said coil.

13. A stator for use in a rotary electric machine comprising:
    a stator ring to be positioned between rotors that can rotate about a center of rotation;
    said stator having a coil mounted on it;
    an electrically conducting wire wound to form said coil;
    said electrically conducting wire of said coil extending in an inner arcuate sector and an outer arcuate sector with redial sectors extending between said inner arcuate sector and said outer arcuate sector;
    said electrically conducting wire of said radial sectors having a width that increases in the radial direction outwardly from said center of rotation.

14. A stator for use in a rotary electric machine as in claim 13 wherein:
    said inner arcuate sector is essentially in the shape of a radius extending around said center of rotation;
    said outer arcuate sector is essentially in the shape of a radius extending around said center of rotation;
    said outer arcuate sector radius is essentially equal to three times said inner arcuate sector radius.

15. A stator for use in a rotary electric machine as in claim 13 wherein:
    said conductor wire forming said coil is wound flat so as to form an essentially coplanar coil.

16. A stator for use in a rotary electric machine as in claim 15 wherein:

said conductor wire of said coil forming said radial sectors with increasing width have a radial width increase such that a line drawn along the sides of said conductor wire will intersect at said center of rotation.

17. A stator for use in a rotary electric machine as in claim 15 wherein:

a plurality of said coils are overlapped on said stator to form an essentially continuous conductor covered radial surface area on said stator.

18. A stator for use in a rotary electric machine as in claim 17 wherein:

said coils are each split into two sections;

said coil sections are separated by baffles and sealing rings;

said baffles and sealing rings both space said phase coil sections and secure said phase coil sections to one another in a spaced configuration;

said baffles and said sealing rings are positioned so as to conduct cooling fluid through said coil sections in a serpentine fashion.

19. A stator for use in a rotary electric machine as in claim 18 wherein:

said inner arcuate sector is essentially in the shape of a radius extending around said center of rotation;

said outer arcuate sector is essentially in the shape of a radius extending around said center of rotation;

said outer arcuate sector radius is essentially equal to three times said inner arcuate sector radius.

20. A stator for use in a rotary electric machine as in claim 13 wherein:

said conductor wires in said inner arcuate sector and in said outer arcuate sector are of an essentially uniform width.

* * * * *